Patented Oct. 23, 1945

2,387,662

UNITED STATES PATENT OFFICE 2,387,662

PLASTICIZERS AND PLASTICIZED COMPOSITIONS

William H. Holst, Tamaqua, Pa., assignor to Atlas Powder Company, Wilmington, Del., a corporation of Delaware No Drawing. Application March 31, 1942,
Serial No. 437,030

14 Claims. (Cl. 260—36)

The present invention relates to plasticizers and plasticized compositions. More particularly, the invention concerns plasticizers for resinous vinyl type polymers, and plasticized vinyl resin compositions.

An object of the invention is to provide a new and valuable class of plasticizers for resinous vinyl type polymers.

Another object of the invention is to provide new and valuable plasticized compositions of resinous vinyl type polymers.

Further objects are to provide a new and valuable class of plasticizers for, and plasticized compositions of, the industrially important hydrophobe polyvinyl resins, including polyvinyl chloride, polyvinyl chloride acetate copolymer, polyvinyl acetate, and the polyvinyl acetals.

A particular object of the invention is the plasticizing of polyvinyl butyral resins by means of my new plasticizers.

A further object is to provide a new safety glass interlayer of plasticized polyvinyl butyral resin.

The above and other objects will become apparent in the course of the following description and claims.

This application is a continuation in part of my application Serial Number 323,583.

The vinyl type resinous polymers are an important class of synthetic resins at the present time. In common with most other synthetic resins, however, most of the useful vinyl resins require the addition of plasticizers to supply properties needed for practical uses. The usefulness of a plasticizer depends on many factors, notably, compatibility with the resin, stability, water resistance, lack of volatility, resistance to ultra violet light, properties imparted to the resin by the plasticizer, and others. Successful plasticizers do not have to rate well in every property since certain applications of resinous plastics do not require all of these properties.

According to the present invention it has been discovered that the class of triacetals and triketals of hexitols, wherein the acetal or ketal groups are derived from aldehydes or ketones with from 4 to 8 carbon atoms, are highly efficient plasticizers for resinous vinyl type polymers. It has further been discovered that the plasticized compositions resulting from the combination of a vinyl polymer and an acetal or ketal of the invention are valuable plastics for use in the arts. For convenience the acetals and ketals of the invention can be designated generically by the expression

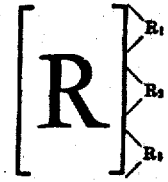

wherein,

R=the hexavalent residue ($C_6H_8O_6$) of a hexitol
$R_1$, $R_2$, and $R_3$=the divalent hydrocarbon residues of non-aromatic aldehydes and ketones having from 4 to 8 carbon atoms.

Among the more important members of this group may be mentioned the hexitol tri-n-butylidenes, notably mannitol tri-n-butylidene, from mannitol and n-butyraldehyde; the hexitol tri-2-butylidenes, e. g., sorbitol tri-2-butylidene, from sorbitol and methyl ethyl ketone; and the hexitol tri-hexylidenes, such as, mannitol tri-(2-ethyl butylidene), from mannitol and 2-ethyl butyraldehyde. The mannitol and sorbitol condensation products are preferred, but the other isomeric hexitols can also be used as starting materials.

Other carbonyl compounds which may be used as the source of acetal or ketal groups include isobutyraldehyde, 2-methol pentanal-1, trimethyl acetaldehyde, n-hexanal or capronaldehyde, the methyl pentanals, dimethyl butyraldehydes, trimethyl propionaldehyde, the propyl and isopropyl methyl ketones, and the four butyl methyl ketones, particularly the methyl iso-butyl ketone, heptaldehydes, methyl amyl ketones, octaldehydes, methyl hexyl ketones, etc.

I may also employ cyclic starting materials such as cyclohexanone, methyl cyclopentanone, dimethyl or ethyl cyclobutanone, and cyclopentyl aldehyde. Another group comprises unsaturated aldehydes and ketones, such as crotonaldehyde, hexadienal, vinyl crotonaldehyde and mesityl oxide.

Particular interest, on the score of ease of synthesis, and mild odor, attaches to the products from hexitols and the acyclic, saturated aldehydes and methyl ketones, and within this group lie the preferred plasticizers of my invention.

As a class the compounds of my invention are colorless, virtually insoluble in cold water, resistant to hydrolysis by water and bases, compatible with vinyl type polymers, and with high boiling points, in the range of 160° to 190° at 5 mm. pressure. They are either liquids or, in certain cases, and when highly purified, low melting solids.

The aldehydes and ketones may be combined with a given hexitol to give homogeneous derivatives, or mixtures of two or more aldehydes or ketones, or aldehydes and ketones may be employed. I may likewise employ mixtures of different hexitols with one or more carbonyl compounds. The use of chemically mixed derivatives is advantageous from the the standpoint of compatibility and also freedom from crystallinity. Whereas crystallinity does not destroy the usefulness of plasticizers for vinyl derivatives, it is frequently desirable to market, ship and use plasticizers which are liquid and free from any tendency to crystallize.

In the case of the higher aldehydes and ketones, and particularly with the higher branched chain ketones, homogeneous tri-derivatives are difficult to make because of lower reactivity and steric factors. Mono- or di-derivatives are, however, relatively easy to make and it is then advantageous to react the remaining hexitol hydroxyl groups with a lower, more reactive member of the said aldehyde or ketone group, for instance, n-butyraldehyde or methyl ethyl ketone.

The triacetals and triketals may be synthesized by any of the known methods of acetal synthesis, such as by heating the ingredients, in presence of catalysts such as mineral acids, zinc chloride, or copper sulfate. Alternatively, condensation may be effected in solution, using either an inert solvent, such as toluene, or excess of the liquid carbonyl compound, and removing the water of condensation by azeotropic distillation, or by distillation and external desiccation.

EXAMPLE 1

PREPARATION OF SORBITOL TRIBUTYLIDENE 91 g. (0.5 mol) of crystalline sorbitol and 120 g. (1.66 mol) of n-butyraldehyde were mixed with 500 ml. of dioxane and to this were added 25 ml. of concentrated $H_2SO_4$. This mixture was heated on a steam bath for one hour with stirring. At the end of this time the entire mass was poured into 1500 ml. of water containing 40 g. of NaOH for neutralization. The aqueous solution was extracted with 100 ml. of ether and the ether solution separated and dried with anhydrous calcium sulfate. After filtering off the drier the volatile solvents were distilled from the filtrate under reduced pressure and the residue was distilled under vacuum. The residue contained two fractions, 68 g. of a liquid boiling at 162-167° C. at 4 mm. pressure and 37 g. of a liquid boiling at 172-177° C. at 4 mm. pressure. Analysis of both fractions showed them to consist of isomeric forms of tributylidene sorbitol.

EXAMPLE 2

PREPARATION OF MANNITOL TRI-2-ETHYL BUTYLIDENE 637 g. of mannitol were suspended in 2000 ml. of dioxane containing 1200 g. of 2-ethyl butyraldehyde, and 75 cc. of concentrated sulfuric acid. The reaction mixture was kept at 70°–80° C. for 90 minutes, with stirring, during which time the mannitol went into solution. The solution, after cooling, was poured into cold water containing a slight excess of sodium hydroxide over that required for neutralizing the acid, the non-aqueous layer collected, washed with water, and then taken up in ether. After drying over anhydrous calcium sulfate, the solvent was evaporated off, and the product distilled at a pressure of 3 mm. Hg. It boiled at 185–187° C. at this pressure.

The following table summarizes the properties of several acetals and ketals prepared by similar methods:

*Table I*

| Name | Aldehyde or ketone | Boiling point | Pressure in mm. of Hg | Solubility in gms./100 cc. water at— | | Index of refraction $n_D^{25}$ | Rotation $[\alpha]_D^{25}$ * | Density at 25° C. |
| --- | --- | --- | --- | --- | --- | --- | --- | --- |
| | | | | 25° C. | 90° C. | | | |
| Mannitol-butylidene | n-Butyraldehyde | 160–161 | 3 | Insol | Insol | 1.458 | +3.61 | 1.0649 |
| Sorbitol tri-butylidene | do | 162–167 | 4 | do | 0.03 | 1.462 | +9.97 | 1.0748 |
| Mannitol tri-2-butylidene | Methyl ethyl ketone | 145–148 | 4 | do | 0.12 | 1.454 | +24.25 | 1.0707 |
| Sorbitol tri-2-butylidene | do | 148–153 | 4 | do | 0.08 | 1.455 | +22.23 | 1.0701 |
| Mannitol tri-2-ethyl butylidene | 2-ethyl butyraldehyde | 185–187 | 3 | do | Insol | 1.463 | +22.20 | 1.0344 |
| Sorbitol tri-2-ethyl butylidene | do | 172–175 | 3 | do | do | 1.466 | +18.60 | 1.0443 |
| Mannitol tri-2-amylidene | Methyl propyl ketone | 170–175 | 3 | do | 0.01 | | | |
| Sorbitol tri-2-amylidene | do | 158–163 | 3 | do | 0.02 | | | |

* In absolute ethanol, C=10.

According to this invention I can plasticize a wide variety of vinyl-type resins. These resins should be of the hydrophobe, that is, water-insoluble, type to ensure compatibility with my water-insoluble plasticizers. Among this class of resins are polyvinyl chloride, various vinyl chloride-acetate copolymers, the copolymers of vinyl chloride with other lower aliphatic vinyl esters, such as propionate, butyrate and chloracetate, copolymers of vinyl chloride with lower vinyl ethers, such as ethyl, butyl, cyclohexyl, polymers of lower vinyl ketones such as methyl vinyl, and certain polyvinyl acetals. These polyvinyl acetals, for which my plasticizers are particularly useful, should contain no more than 35% free hydroxyl groups, and at least 60% of the acetal groups must have three to six carbon atoms. Examples of such polyvinyl acetals include the safety glass type of butyral resin, containing about 20% free hydroxyl, 2% residual acetate, and 78% butyral. Other modifications, in which up to 40%, but usually not more than 20%, of the hydroxyls in the resin are substituted by other acetal groups, such as formal, acetal, or benzal, may be employed.

With polyvinyl chloride-acetate copolymer the triacetals and triketals may be used to formulate protective coatings, varnishes and lacquers. Similarly with mixed polyvinyl acetals such as formal-butyral, or acetal-butyral, a variety of useful compositions, adapted for lacquer formulation, sheeting, extrusion, the manufacture of photographic films, artificial leathers and other technical applications, may be obtained.

My compositions are particularly effective in combination with polyvinyl butyral for the manufacture of interlayers for laminated safety or shatter-resistant glass.

EXAMPLE 3

A solution of polyvinyl butyral, of the grade known as Vinylite XYSG, of the Carbide and Carbon Chemical Corporation, which contained about 78% butyraldehyde substitution, 2% residual acetate groups and 20% free alcohol groups, was made up by dissolving the resin in denatured alcohol (formula #30), in the ratio of 15% by weight of resin to 85% alcohol. To this was added manitol tri-n-butylidene, in the proportion of 60 parts of plasticizer to 100 parts of the polyvinyl butyral. The mixture so produced was cast on glass and the solvent evaporated to form a film. The film showed excellent adherence to the glass, moisture proofness, toughness, and resistance to ultraviolet light, combined with low volatility. The elongation of the film, by standard test, after casting was 430%.

EXAMPLE 4

Polyvinyl chloride (Carbide and Carbon Chemical Corp. grade Vinylite QYNA), containing about 2% vinyl acetate and 98% vinyl chloride, was dissolved in mesityl oxide to give a 5% solution, by weight. Mannitol tributylidene, equal to 33% by weight of the resin, was added, and a cast film prepared. The plastic mass thus obtained could be hot milled at 120° C. and extruded.

EXAMPLE 5

A solution of polyvinyl chloride acetate was made by dissolving 18.8 parts of the resin in a mixture containing 18.2 parts of cyclohexanone and 32.9 parts of toluene, all parts being by weight. The resin used was the VYHH grade of Vinylite, made by Carbide and Carbon Chemical Corp., and was a 90-10 copolymer of vinyl chloride and vinyl acetate. Mannitol tri-2-butylidene, equal to 33% by weight of the resin, was added to the solution. The film obtained by casting this solution on glass or metal and air drying showed exceptional toughness and resistance to water, soap and alkali attack.

EXAMPLE 6

An alcoholic solution of polyvinyl butyral and mannitol tri-2-butylidene was prepared, as described in Example 3, and cast on a glass plate. The coated glass plate was first air dried at room temperature, then baked at 120° C. for an hour, by which time it was virtually free of solvent. A top piece of plate glass was placed upon the plasticized butyral film, and the resulting glass sandwich introduced into a vacuum oven where the pressure was reduced to 20-30 mm. of mercury. The temperature in the oven was raised to 300° C. for 3 minutes. The vacuum was then released and the glass sandwich cooled. The resulting composite showed excellent adhesion of the interlayer to the glass, even at −30° F., and was perfectly clear.

Incorporation of the plasticized polyvinyl butyral into a glass sandwich may also be carried out by any other means known to the art, such as by placing preformed sheets or foils of the interlayer between glass plates, and heating in a vacuum oven. Also, the interlayer may be extruded hot onto glass, then covered and autoclaved, or the plastic composition may be reduced to a powder, distributed on the bottom plate, compacted with rollers, the cover glass put on, roller pressed and finally autoclaved in a vacuum oven. Again, the interlayer sheet can be inserted, in an underplasticized condition, between two sheets of glass whose inner surfaces are coated with over-plasticized resin, and the bond completed by heating with or without pressure.

The foregoing examples are illustrative of the invention. However, it will be understood that the invention is not limited to these specific applications, but is capable of many variations which will occur to those skilled in this art. Also, numerous uses and applications of such plasticized products will readily occur to those familiar with the art.

What is claimed is:

1. A composition comprising a hydrophobe resin selected from the group consisting of polyvinyl esters and polyvinyl acetals, and a plasticizer consisting essentially of a hexitol tri-cyclic acetal wherein the acetal groups are selected from the group consisting of aliphatic aldehydes with from 4 to 8 carbon atoms, cyclo-aliphatic aldehydes with from 4 to 8 carbon atoms, aliphatic ketones with from 4 to 8 carbon atoms, and cyclo-aliphatic ketones with from 4 to 8 carbon atoms.

2. A composition comprising a hydrophobe polyvinyl butyral resin, and a plasticizer consisting essentially of a hexitol tributylidene.

3. A composition comprising a hydrophobe polyvinyl butyral resin, and a plasticizer consisting essentially of a hexitol tri-2-butylidene.

4. A composition as in claim 3 wherein the said hexitol is mannitol.

5. A composition comprising a hydrophobe polyvinyl butyral resin, and a plasticizer consisting essentially of a hexitol tri-n-butylidene.

6. A safety-type glass interlayer comprising a polyvinyl butyral resin plasticized with a tributylidene of mannitol.

7. A safety-type glass interlayer comprising a polyvinyl butyral resin plasticized with the tributylidene of sorbitol.

8. A composition comprising a hydrophobe resin selected from the group consisting of polyvinyl esters and polyvinyl acetals, and a plasticizer consisting essentially of a hexitol tri-cyclic acetal of an aliphatic aldehyde with from 4 to 8 carbon atoms.

9. A composition comprising a hydrophobe resin selected from the group consisting of polyvinyl esters and polyvinyl acetals, and a plasticizer consisting essentially of a hexitol tri-cyclic acetal of an aliphatic ketone with from 4 to 8 carbon atoms.

10. A composition comprising a hydrophobe resin selected from the group consisting of polyvinyl esters and polyvinyl acetals, and a plasticizer consisting essentially of a hexitol tributylidene.

11. A composition comprising a hydrophobe resin selected from the group consisting of polyvinyl esters and polyvinyl acetals, and a plasticizer consisting essentially of a hexitol tri-n-butylidene.

12. A composition comprising a hydrophobe resin selected from the group consisting of polyvinyl esters and polyvinyl acetals, and a plasticizer consisting essentially of a hexitol tri-2-butylidene.

13. A composition comprising a hydrophobe resin selected from the group consisting of polyvinyl esters and polyvinyl acetals, and a plasticizer consisting essentially of a hexitol tri-2-ethyl butylidene.

14. A composition comprising a hydrophobe resin selected from the group consisting of polyvinyl esters and polyvinyl acetals, and a plasticizer consisting essentially of mannitol tri-2-ethyl butylidene.

WILLIAM H. HOLST.

CERTIFICATE OF CORRECTION.

Patent No. 2,387,662.                                           October 23, 1945.

WILLIAM H. HOLST.

It is hereby certified that error appears in the printed specification of the above numbered patent requiring correction as follows: Page 2, in the table, first column thereof, for "Mannitol-butylidene" read --Mannitol tri-butylidene--; and that the said Letters Patent should be read with this correction therein that the same may conform to the record of the case in the Patent Office.

Signed and sealed this 1st day of January, A. D. 1946.

Leslie Frazer (Seal)                                   First Assistant Commissioner of Patents.

vinyl esters and polyvinyl acetals, and a plasticizer consisting essentially of a hexitol tri-2-butylidene.

13. A composition comprising a hydrophobe resin selected from the group consisting of polyvinyl esters and polyvinyl acetals, and a plasticizer consisting essentially of a hexitol tri-2-ethyl butylidene.

14. A composition comprising a hydrophobe resin selected from the group consisting of polyvinyl esters and polyvinyl acetals, and a plasticizer consisting essentially of mannitol tri-2-ethyl butylidene.

WILLIAM H. HOLST.

CERTIFICATE OF CORRECTION.

Patent No. 2,387,662. October 23, 1945.

WILLIAM H. HOLST.

It is hereby certified that error appears in the printed specification of the above numbered patent requiring correction as follows: Page 2, in the table, first column thereof, for "Mannitol-butylidene" read --Mannitol tri-butylidene--; and that the said Letters Patent should be read with this correction therein that the same may conform to the record of the case in the Patent Office.

Signed and sealed this 1st day of January, A. D. 1946.

Leslie Frazer (Seal) First Assistant Commissioner of Patents.